United States Patent
Akhteruzzaman et al.

(10) Patent No.: US 6,701,156 B2
(45) Date of Patent: Mar. 2, 2004

(54) SYSTEM AND METHOD FOR MANAGING RESPONSE TO A NEED AT A SITE

(76) Inventors: Akhter Akhteruzzaman, 1585 Marquette Ave., Naperville, IL (US) 60565; Paul Raymond Sand, 11 Pheasant Ct., Woodridge, IL (US) 60517; Richard Grant Sparber, 2033 Gladstone Dr., Wheaton, IL (US) 60187

( * ) Notice: Subject to any disclaimer, the term of this patent is extended or adjusted under 35 U.S.C. 154(b) by 475 days.

(21) Appl. No.: 09/740,362

(22) Filed: Dec. 19, 2000

(65) Prior Publication Data

US 2002/0077137 A1 Jun. 20, 2002

(51) Int. Cl.[7] .............................. H04B 7/00; H04Q 7/20
(52) U.S. Cl. .................... 455/521; 455/404.1; 455/507; 455/456.3
(58) Field of Search .......................... 340/825.49, 988, 340/7.5; 455/404.1, 404.2, 521, 456.2, 456.3, 440, 517, 11.1, 3.03, 3.04, 3.05, 414.2, 414.1, 424, 426.1, 435.1, 448, 450, 456.1, 456.5, 458, 507, 510, 511, 520, 569.2

(56) References Cited

U.S. PATENT DOCUMENTS

| | | | | |
|---|---|---|---|---|
| 5,705,980 A | * | 1/1998 | Shapiro | 455/11.1 |
| 5,767,788 A | * | 6/1998 | Ness | 340/825.49 |
| 5,835,907 A | * | 11/1998 | Newman | 455/404.2 |
| 6,212,393 B1 | * | 4/2001 | Suarez et al. | 455/456.4 |
| 6,404,352 B1 | * | 6/2002 | Ichikawa et al. | 340/426.28 |

* cited by examiner

Primary Examiner—Nay Maung
Assistant Examiner—John J Lee

(57) ABSTRACT

A system for managing response to a need at a site includes: (a) a control facility that can effect wireless data communication and voice communication; and (b) a plurality of response units that can effect wireless data communication and voice communication. The control facility effects an initial contact with a selected response unit using wireless data communication. The selected response unit communicates a response signal to the initial contact using wireless data communication. The response signal includes characteristic data relating to the selected responding unit that includes information relating to situs of the selected responding unit. The method includes steps of: (a) providing a managing facility and responding units; (b) effecting initial contact among the managing facility and selected responding units using wireless data communication; and (c) communicating a responsive signal by a responding unit to the managing facility using wireless data communication.

12 Claims, 3 Drawing Sheets

SYSTEM AND METHOD FOR MANAGING RESPONSE TO A NEED AT A SITE

BACKGROUND OF THE INVENTION

The present invention is directed to systems and methods for managing special services, and especially to coordinating provision of emergency services to satisfy an emergency need at a site.

In situations that require special services at a site remote from people or equipment capable of rendering the required service, there is a need to dispatch the needed personnel or equipment to the site at which the services are required. One exemplary such situation is when there is a need for emergency services such as fire, police or emergency medical services. In emergency service situations, the need to quickly and efficiently provide appropriate personnel and equipment on-scene is often critical.

Communication systems presently available to dispatchers include, for example, two-way radio systems, cellular telephone systems and pager systems. Such systems are commonly used to notify personnel or units of the existence of an emergency situation that may require their participation, or such systems may be employed to dispatch units to an emergency site. None of the presently employed communication systems provide a dispatcher with any understanding of the real-time geographic location a respective person or unit or a real-time understanding of equipment available or the training level of personnel available for service.

There is a need for a system and method for managing, or coordinating a response to a need, such as providing emergency services, at a site that provides appropriate real-time information to a dispatcher for quick response to the extant situation with appropriate equipment and properly trained personnel.

There is a need for a system and method for managing, or coordinating a response to a need, such as providing emergency services, at a site that quickly identifies the composition and location of available resources (e.g., properly trained personnel and equipment) to assist timely and efficient deployment of needed resources to the site.

SUMMARY OF THE INVENTION

A system for managing response to a need at a site includes: (a) a control facility; having a control wireless communication unit that is capable of effecting wireless data communication and voice communication; and (b) a plurality of response units, each having a respective response wireless communication unit that is capable of effecting wireless data communication and voice communication. The control facility identifies the need and the site. The control facility effects an initial contact with at least one selected response unit of the plurality of response units using wireless data communication. The at least one selected response unit communicates a response signal to the initial contact using wireless data communication. The response signal includes characteristic data relating to the at least one selected responding unit. The characteristic data includes information relating to situs of the at least one selected responding unit.

It is therefore an object of the present invention to provide a system and method for managing, or coordinating a response to a need at a site that identifies resources in terms of their geographic location.

It is a further object of the present invention to provide a system and method for managing, or coordinating a response to a need at a site that identifies resources in terms of their available equipment.

It is yet a further object of the present invention to provide a system and method for managing, or coordinating a response to a need at a site that identifies resources in terms of the training of personnel.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
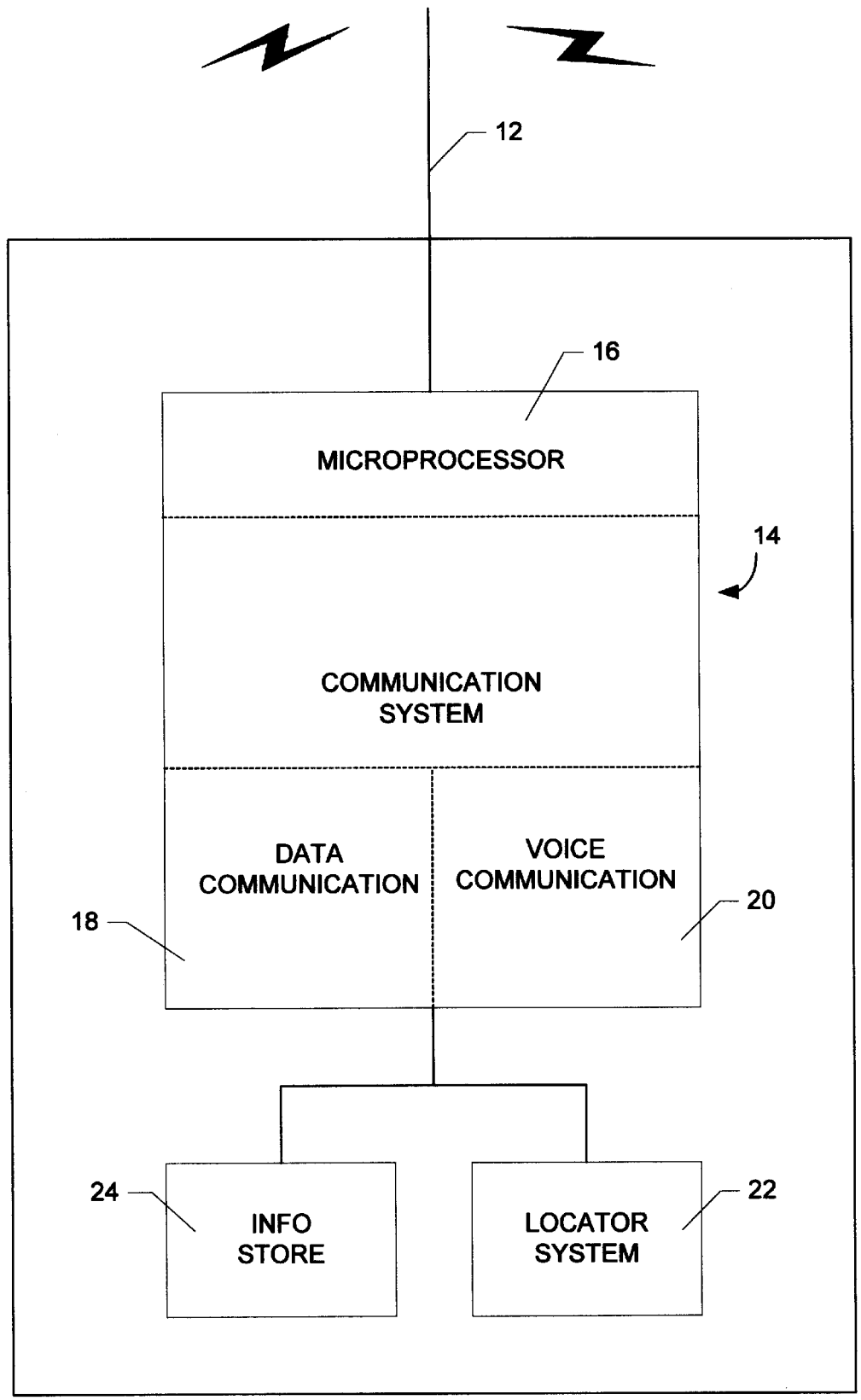
FIG. 1 is a schematic block diagram illustrating a communication system appropriate for use with the present invention.

People with emergency response skills, and specialized equipment for providing emergency services are often near a site of an emergency situation in which their skills can be useful. However, oftentimes emergency service dispatchers are not aware of the availability of the resources to the site at which they can be advantageously employed; they are not aware of the skill set available nor are they aware of the proximity of the resource to the emergency site. The system and method of the present invention facilitate providing appropriate information to dispatchers in real time to enhance efficiency of dispatch operations in terms of timeliness of response and appropriateness of resources sent to a particular emergency site.

The invention provides a system and method for matching staff and equipment with needs in real time. According to the preferred embodiment of the invention, each staff member of an emergency service crew carries a cellular telephone or other wireless communication device that has both wireless voice communication and wireless data communication capabilities. A dispatcher (e.g., a public safety answering position; PSAP) may receive notification of an emergency situation by one or more of several ways, including, by way of example, emergency service telephone (e.g., E911 service), public switched telephone network (PSTN), official radio network, amateur radio network (i.e., ham radio) or other communication facilities.

According to the preferred embodiment of the present invention, a dispatcher can query all staff members' personal communication devices (or a communication device associated with a piece of equipment, such as an emergency service truck or ambulance) within an appropriate geographic area. Limitation to a predetermined geographic area can be effected by selection of transmitting antennas that service only the predetermined area, by a coded address scheme for calling selected remote communication units or by another addressee-limiting scheme.

The initial query is preferably carried out using a wireless data communication capability that elicits an automatic initial response by the addressed remote communication units with no action or intervention necessary by an operator of a respective remote communication unit. The automatic initial response that is communicated to the dispatcher preferably includes information relating to the operator/carrier of the particular remote communication unit, such as geographic location, distance from the site of the emergency expressed in miles or driving time, equipment accompanying the operator/carrier, training level of the operator/carrier and other relevant information useful to the dispatcher for timely and efficiently dispatching appropriate resources to the emergency site. If the automatic initial data response from one or more given remote unit is deemed appropriate for employment for response to the emergency at hand, the dispatcher may follow-up with the particular unit or units via wireless voice communications to effect coordination of the assignment contemplated by the dispatcher.

Another item of information that may be provided by the dispatcher in either the initial query or in a follow-up communication is an indication of the location of the emergency site that may be used by a remote unit. Using such information, users of the various remote units may use a location indicating capability, such as GPS (Global Positioning System) to obtain an indication of distance to the emergency site or directions to the emergency site.

A particularly useful format for the automatic initial response contemplates providing data to populate a predetermined table of information for the dispatcher to facilitate rapid comparison of capabilities associated with responding units. Familiarity by dispatchers with a presentation format of such comparative information facilitates increased speed and accuracy in evaluating the data available for dispatching decisions.

FIG. 1 is a schematic block diagram illustrating a communication system appropriate for use with the present invention. In FIG. 1, a two-way communication apparatus 10 includes an antenna 12 coupled with a communication system 14. Communication system 14 includes a microprocessor 16 for controlling operation of communication system 14. Communication system 14 preferably is configured for wireless data communication, as indicated by a data communication section 18, and configured for wireless voice communication, as indicated by a voice communication section 20.

Communication apparatus 10 also includes a locator system 22 coupled with communication system 14, and an information store 24 coupled with communication system 14. Locator system 22 is preferably embodied in a global positioning system (GPS) device, or a similar device that indicates geographic location of communication apparatus 10. Information store 24 is preferably programmable to store information, especially information relating to a host device (not shown in FIG. 1) in which communication apparatus 10 is installed. Such stored information may, for example, relate to emergency equipment accompanying the host device, training level of a person associated with the host device, or other relevant information.

In operation, communication apparatus 10 responds to receiving an appropriate signal at antenna 12 by generating and transmitting a responsive communication. An appropriate signal is a signal for which communication apparatus 10 is programmed to respond, as recognized by microprocessor 16. Preferably, microprocessor 16 controls communication system 14 to cause the responsive communication to be sent automatically upon receipt of the appropriate signal.

Information contained within the responsive communication includes geographic information relating to the geographic location of communication apparatus 10, as indicated by locator system 22. Further information included within the responsive communication may include information stored in information store 24 that is relevant to the situation for which communication apparatus 10 is intended to be employed. In the exemplary situation where the appropriate received signal is from an emergency services dispatcher, information included from information store 24 in the responsive communication transmitted by communication apparatus 10 may include information relating to emergency equipment co-located with communication apparatus 10, training level of personnel associated with communication apparatus 10, and other information relevant to timely and efficient dispatching of resources for dealing with an emergency situation at an emergency site.

Figure 2:
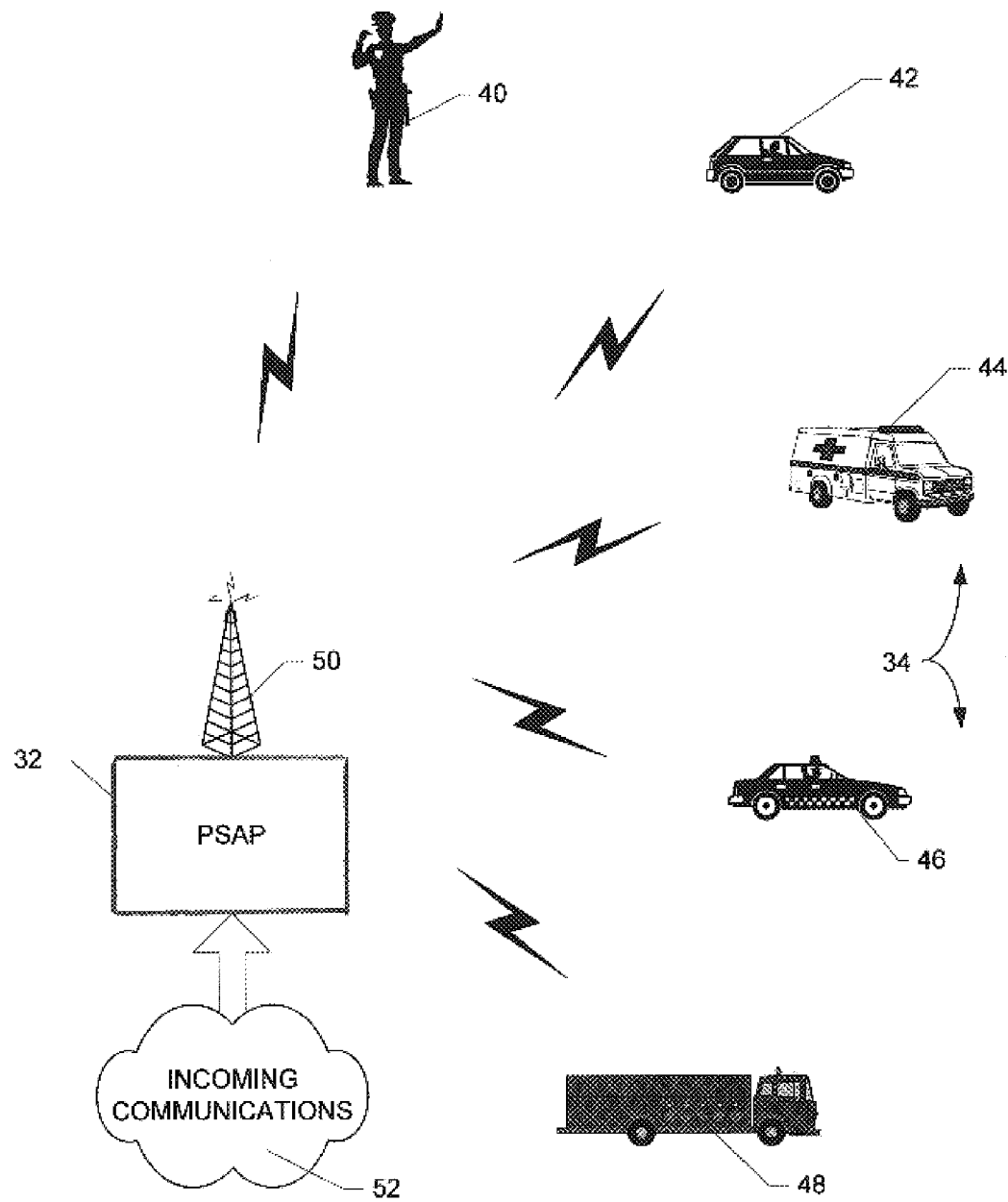
FIG. 2 is a schematic diagram illustrating the system of the present invention.

FIG. 2 is a schematic diagram illustrating the system of the present invention. In FIG. 2, an emergency service dispatch system 30 includes a public safety answering position (PSAP) 32 and a plurality of mobile emergency assets 34. Plurality of mobile emergency assets include, by way of example, a police officer 40, an off-duty emergency worker 42, an ambulance 44, a police cruiser 46 and a firetruck 48. PSAP 32 is equipped with a two-way communication device (not shown in FIG. 2) that transmits and receives voice and data communications via an antenna 50.

This is one embodiment of the present invention. Another embodiment may include use of the public switched telephone network (PSTN), defined broadly herein to include all publicly accessible telephone networks including, for example, cellular networks, private phone exchanges, and other such networks to establish voice and data communications with mobile assets 34.

In the embodiment of the present invention illustrated in FIG. 2, PSAP 32 may receive notice of an emergency situation occurring at an emergency site from any of a number of sources, as indicated by cloud 52. Thus, cloud 52 may include such information sources as a PSTN, an emergency telephone network (e.g., an E911 telephone network), an official radio network such as a governmental radio network (e.g., a Federal Emergency Management Agency—FEMA—network), an amateur radio network (e.g., a ham radio operator), or from another source.

Preferably, appropriate communication units of the type that were described in connection with FIG. 1 (not shown in detail in FIG. 2) are carried by each respective remote mobile asset 34. When PSAP 32 receives notice that an emergency situation is occurring, PSAP 32 seeks to effect a timely and efficient dispatching of resources to handle the emergency. Accordingly, according to the present invention, PSAP 32 queries respective mobile emergency assets 34 using a wireless data communication transmission that is encoded to elicit a predetermined response from communication units of the sort described in connection with FIG. 1 that are carried by each respective mobile asset 34.

Communication units for each mobile emergency asset automatically transmits a predetermined response communication to PSAP 32 (as described in connection with FIG. 1). By such an automatic transmitting of pertinent information using wireless data communications, dispatchers at PSAP 32 are almost immediately apprised of assets available for dispatch and the whereabouts of the respective assets. That is, for example, PSAP 32 is informed by automatic response communications of the makeup, training and location of mobile emergency assets 34. Such timely information facilitates efficient dispatching of assets for dealing with the extant emergency.

Using data communications capabilities may further facilitate rapid evaluation by dispatchers of information thereby transferred. For example, data contained in automatic response communications from remote emergency assets 34 may be designed to populate a preformatted comparative table for easy use by dispatcher personnel in making decisions relating to efficiently assigning and dispatching assets to the emergency site.

Figure 3:
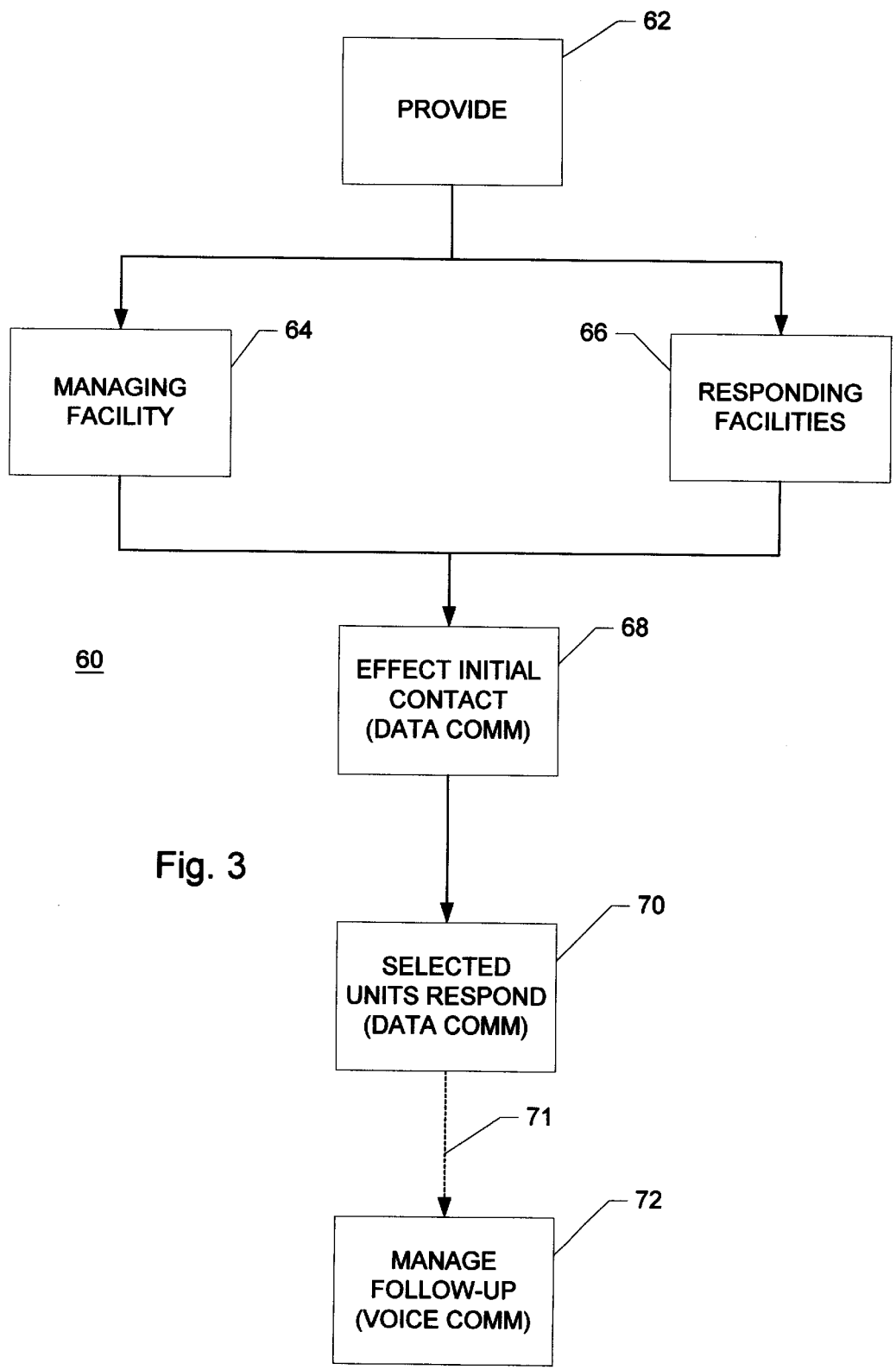
FIG. 3 is a block diagram illustrating the method of the present invention.

FIG. 3 is a block diagram illustrating the method of the present invention. In FIG. 3, a method 60 begins with providing (as indicated by a block 62) in no particular order, (1) a managing facility, as indicated by a block 64 and (2) a plurality of responding units, as indicated by a block 66.

The managing facility has a managing communication unit capable of effecting wireless data communication and capable of effecting wireless voice communication. Each respective responding unit of the plurality of responding units has a response wireless communication unit capable of effecting wireless data communication and capable of effecting wireless voice communication.

The method continues by effecting an initial contact by the managing facility with at least one selected responding unit of the plurality of responding units using wireless data communication, as indicated by a block 68.

The method continues with a next step of communicating a responsive signal using wireless data communication by at least one selected responding unit to the managing facility, as indicated by a block 70. The responsive signal includes information relating to the situs of the at least one selected responding unit. The responsive signal may also include information relating to equipment available with the at least one responding unit, training level of personnel available with the at least one selected responding unit, and other information.

The initial contact may be effected using a broadcast communication, individually coded addresses for respective responding units, a public switched telephone network (PSTN), another communication network or a combination of communication networks.

The method may continue (as indicated by dotted-line arrow 71) with a step by which follow-up coordination may be effected using wireless voice communication for employing the at least one selected responding unit for fulfilling the need at the site, as indicated by a block 72.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. A system for managing response to a need at a site; the system comprising:
   (a) a managing facility; and
   (b) a plurality of responding units; said managing facility identifying said need and said site; said managing facility being in wireless communication for effecting an initial contact with at least one selected responding unit of said plurality of responding units; said at least one selected responding unit communicating a responsive signal to said initial contact; said responsive signal including characteristic data relating to said at least one selected responding unit; said characteristic data including information relating to situs of said at least one selected responding unit; said characteristic data further including information relating to equipment available with said at least one selected responding unit.

2. A system for managing response to a need at a site as recited in claim 1 wherein said characteristic data further includes information relating to training level of personnel available with said at least one selected responding unit.

3. A system for managing response to a need at a site as recited in claim 1 wherein said at least one selected responding unit includes a locator system for determining location of said at least one selected responding system, wherein said initial contact includes information relating to said site and wherein said at least one selected responding unit employs said locator system and said information relating to said site to generate travel directions from said situs to said site.

4. A system for coordinating a response to a need at a site; the system comprising:
   (a) a control facility; said control facility having a control wireless communication unit; said control wireless communication unit being capable of effecting wireless data communication and being capable of effecting wireless voice communication; and
   (b) a plurality of response units; each respective response unit of said plurality of response units having a respective response wireless communication unit; each said respective response wireless communication unit being capable of effecting wireless data communication and being capable of effecting wireless voice communication;
said control facility identifying said need and said site; said control facility effecting an initial contact with at least one selected response unit of said plurality of response units; said initial contact being effected using said wireless data communication; said at least one selected response unit communicating a response signal to said initial contact; said response signal being effected using said wireless data communication; said response signal including characteristic data relating to said at least one selected responding unit; said characteristic data including information relating to situs of said at least one selected responding unit; said characteristic data further including information relating to equipment available with said at least one selected responding unit.

5. A system for coordinating a response to a need at a site as recited in claim 4 wherein said characteristic data further includes information relating to training level of personnel available with said at least one selected responding unit.

6. A system for coordinating a response to a need at a site as recited in claim 4 wherein said at least one selected responding unit includes a locator system for determining location of said at least one selected responding system, wherein said initial contact includes information relating to said site and wherein said at least one selected responding unit employs said locator system and said information relating to said site to generate travel directions from said situs to said site.

7. A method for coordinating a response to a need at a site; the method comprising the steps of:
   (a) providing, in no particular order:
       (1) a managing facility; said managing facility having a managing communication unit capable of effecting wireless data communication and capable of effecting wireless voice communication; and
       (2) a plurality of responding units; each respective responding unit of said plurality of responding units having a response wireless communication unit capable of effecting wireless data communication and capable of effecting wireless voice communication;

(b) effecting an initial contact by said managing facility with at least one selected responding unit of said plurality of responding units; said initial contact being effected using said wireless data communication; and (c) communicating a responsive signal by said at least one selected responding unit to said managing facility; said responsive signal being effected using said wireless data communication; said responsive signal including information relating to situs of said at least one selected responding unit; said information further relating to equipment available with said at least one selected responding unit.

8. A method for coordinating a response to a need at a site as recited in claim 7 wherein said at least one selected responding unit includes a locator system for determining location of said at least one selected responding system, wherein said initial contact includes information relating to said site and wherein the method comprises the further step of:

(d) said at least one selected responding unit employing said locator system and said information relating to said site to generate travel directions from said situs to said site.

9. A method for coordinating a response to a need at a site as recited in claim 7 wherein said information further relates to training level of personnel available with said at least one selected responding unit.

10. A system for managing response to a need at a site; the system comprising:

(a) a managing facility; and (b) a plurality of responding units; said managing facility identifying said need and said site; said managing facility being in wireless communication for effecting an initial contact with at least one selected responding unit of said plurality of responding units; said at least one selected responding unit communicating a responsive signal to said initial contact; said responsive signal including characteristic data relating to said at least one selected responding unit; said characteristic data including information relating to situs of said at least one selected responding unit; said characteristic data further including information relating to training level of personnel available with said at least one selected responding unit.

11. A system for coordinating a response to a need at a site; the system comprising:

(a) a control facility; said control facility having a control wireless communication unit; said control wireless communication unit being capable of effecting wireless data communication and being capable of effecting wireless voice communication; and (b) a plurality of response units; each respective response unit of said plurality of response units having a respective response wireless communication unit; each said respective response wireless communication unit being capable of effecting wireless data communication and being capable of effecting wireless voice communication;

said control facility identifying said need and said site; said control facility effecting an initial contact with at least one selected response unit of said plurality of response units; said initial contact being effected using said wireless data communication; said at least one selected response unit communicating a response signal to said initial contact; said response signal being effected using said wireless data communication; said response signal including characteristic data relating to said at least one selected responding unit; said characteristic data including information relating to situs of said at least one selected responding unit; said characteristic data further including information relating to training level of personnel available with said at least one selected responding unit.

12. A method for coordinating a response to a need at a site; the method comprising the steps of:

(a) providing, in no particular order:

(1) a managing facility; said managing facility having a managing communication unit capable of effecting wireless data communication and capable of effecting wireless voice communication; and (2) a plurality of responding units; each respective responding unit of said plurality of responding units having a response wireless communication unit capable of effecting wireless data communication and capable of effecting wireless voice communication;

(b) effecting an initial contact by said managing facility with at least one selected responding unit of said plurality of responding units; said initial contact being effected using said wireless data communication; and (c) communicating a responsive signal by said at least one selected responding unit to said managing facility; said responsive signal being effected using said wireless data communication; said responsive signal including information relating to situs of said at least one selected responding unit; said information further relating to equipment available with said at least one selected responding unit.

* * * * *

UNITED STATES PATENT AND TRADEMARK OFFICE
CERTIFICATE OF CORRECTION

PATENT NO. : 6,701,156 B2
DATED : March 2, 2004
INVENTOR(S) : Akhter Akhteruzzaman, Paul Raymond Sand and Richard Grant Sparber It is certified that error appears in the above-identified patent and that said Letters Patent is hereby corrected as shown below:

<u>Title page,</u>
Insert Item -- [73] Assignee: Lucent Technologies Inc., Murray Hill, N.J. --

Signed and Sealed this

Third Day of August, 2004

JON W. DUDAS
*Acting Director of the United States Patent and Trademark Office*